(No Model.)
J. M. HARPER.
Corn Popper.
No. 229,123. Patented June 22, 1880.
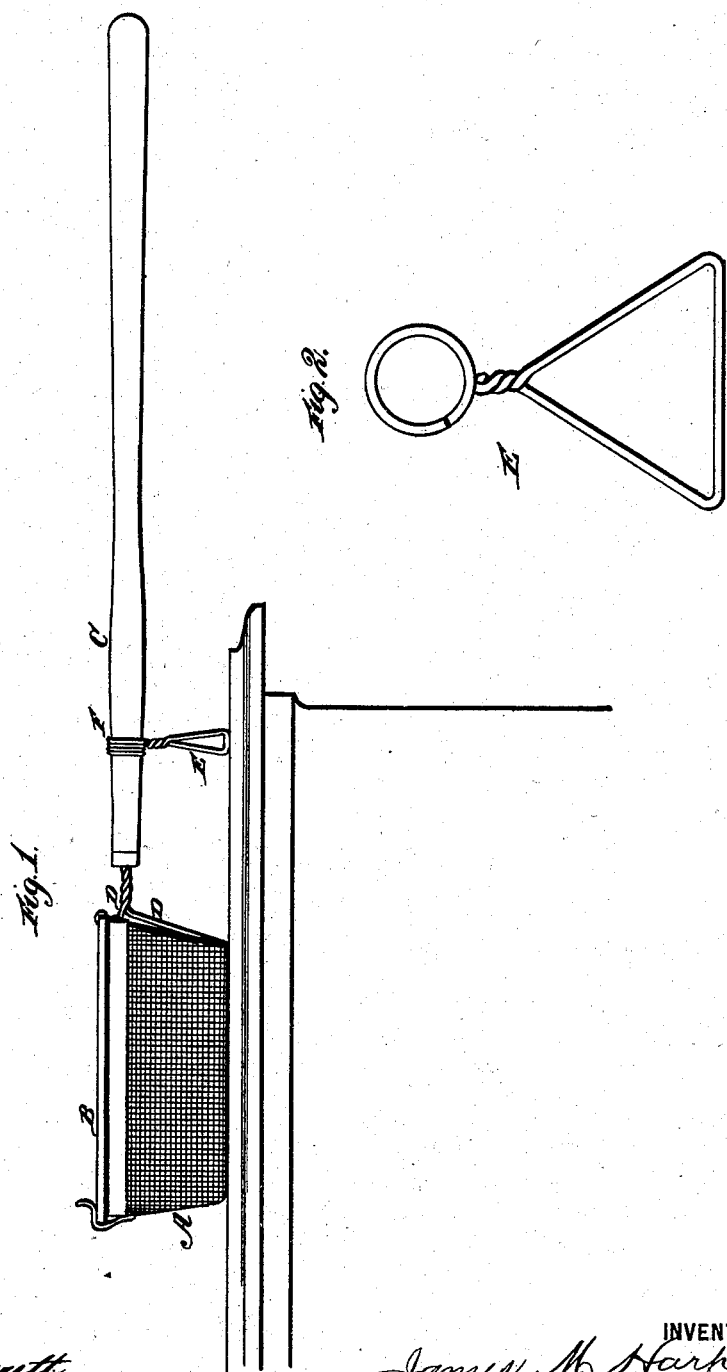
WITNESSES
Robert Everett
James J. Sheehy
INVENTOR
James M. Harper
Gilmore, Smith & Co.,
ATTORNEYS

UNITED STATES PATENT OFFICE.

JAMES M. HARPER, OF EL PASO, ILLINOIS.

CORN-POPPER.

SPECIFICATION forming part of Letters Patent No. 229,123, dated June 22, 1880.

Application filed April 5, 1880. (No model.)

*To all whom it may concern:*

Be it known that I, JAMES M. HARPER, of El Paso, in the county of Woodford and State of Illinois, have invented certain new and useful Improvements in Corn-Poppers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my corn-popper, showing the same over a stove, and Fig. 2 is a view of the arm-rest.

My invention relates to that class of devices known as "corn-poppers." 1 will here premise that these devices generally consist of a body, A, made of open wire-work, a hinged cover, B, and a handle, C, connected with the body A by wires D D.

In popping corn the person using the popper is obliged to hold the handle of the popper, and consequently will stand near the fire.
Now, in order to pop the corn the stove must be very hot, and hence a great inconvenience is felt by the person using the device.

The object of my invention is to remedy this defect in corn-poppers; and it consists in a rest which will support the handle, and thus enable the operator to stand away from the fire, except when the popper is to be agitated.

My improvement consists in a rest, E, formed of wire or a metal band, the same being secured to the handle at F. The wire is wrapped around the handle and then bent into a triangular shape, so that the base of the triangle will rest upon the top of the stove. The position of this improved popper upon a stove is illustrated in Fig. 1. This rest maintains the handle at an elevated position above the stove, and hence prevents the handle, which is of wood, from being burned or scorched.

I am aware that frying-pans and other domestic utensils have been provided with braces, some at a point near the vessel or basin and others at a point on the handle more remote therefrom, and these I do not claim as my invention.

Having thus described my invention, what I claim is—

The combination of the corn-popper A with the rest E, composed of a wire bent into triangular shape and twisted near its ends to form the apex of the triangle, the untwisted portions of the ends of said wire being wrapped around the handle C of the popper, substantially as herein shown and specified.

In testimony that I claim the above I have hereunto subscribed my name in the presence of two witnesses.

JAMES M. HARPER.

Witnesses:
STEPHEN K. HAYWARD,
DAVID F. SNEED.